Dec. 18, 1951 — L. R. MAST ET AL — 2,578,819
CONTROLLED ELECTRIC HEATER
Filed July 13, 1949 — 2 SHEETS—SHEET 1
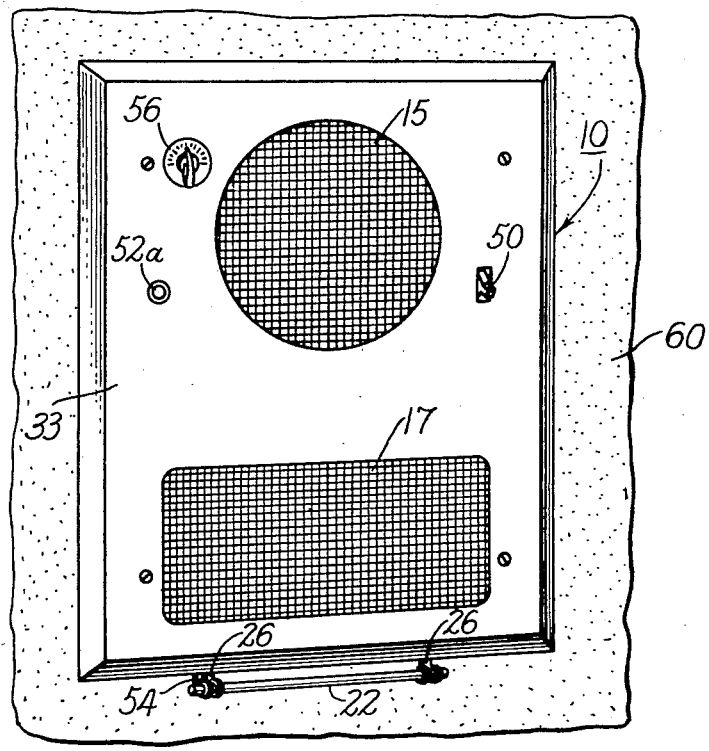
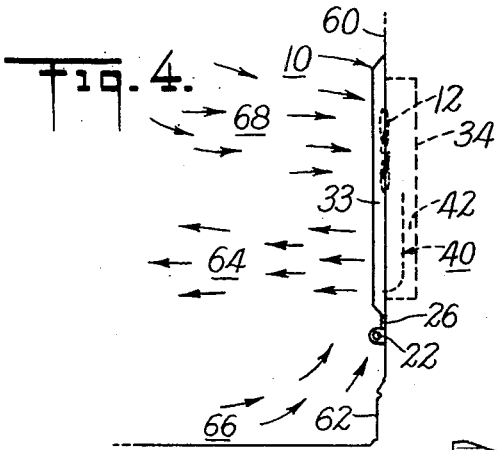
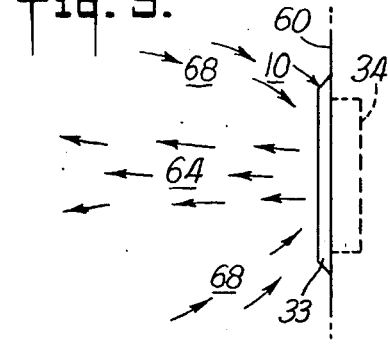
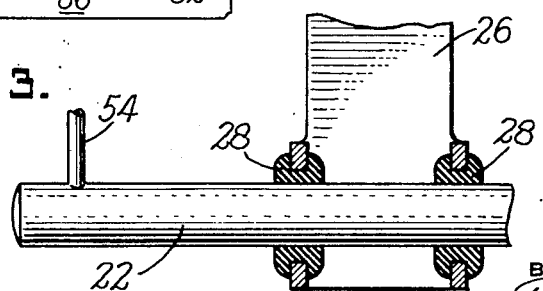
INVENTORS
Lowell R. Mast
William T. Craig
BY Blair + Black
ATTORNEYS Dec. 18, 1951  L. R. MAST ET AL  2,578,819
CONTROLLED ELECTRIC HEATER Filed July 13, 1949  2 SHEETS—SHEET 2

INVENTORS
Lowell R. Mast
BY William T. Craig
Blair + Black
ATTORNEYS

Patented Dec. 18, 1951

2,578,819

UNITED STATES PATENT OFFICE 2,578,819

CONTROLLED ELECTRIC HEATER

Lowell R. Mast, East Rochester, and William T. Craig, Pittsford, N. Y., assignors to Electromode Corporation, Rochester, N. Y.

Application July 13, 1949, Serial No. 104,434

7 Claims. (Cl. 219—39)

This invention relates to a thermostatically controlled heater and more particularly to a unitary forced-draft thermostatically controlled heater of the type adapted to be installed in or against a room wall.

An object of this invention is to provide a heater of the above character which will efficiently control the temperature of a room. Another object is to provide a heater of the above character which is simple in construction and efficient and reliable in operation. Another object is to provide a heater of the above character in which an air space substantially at room temperature is provided directly below the heater. A further object is to provide a heater of the above character having a thermostat attached to the bottom of said heater to respond in a reliable manner to the room temperature there prevailing. A still further object is to provide a heater of the above character which will maintain a substantially uniform temperature throughout the living area of a room, thereby eliminating cold drafts at the bottom of the room. Other objects will be in part apparent and in part pointed out below.

The invention accordingly consists in the features of construction, combinations of elements, and arrangements of parts, and relation and order of each of the same to one or more of the others, all as will be illustratively described herein, and the scope of the application of which will be indicated in the folowing claims.

In the drawings:

Figure 1 is a front perspective view of the installed heater;

Figure 3 is an enlarged fragmentary front elevation of the thermostatic bulb, its mode of attachment to the heater being shown in sections;

Figure 4 is a schematic diagram illustrating in side elevation the circulation of air through the heater and adjacent parts of a room;

Figure 5 is a schematic diagram further illustrating in top plan view the circulation of air to and from the heater and adjacent parts of the room.

Similar reference characteristics refer to similar parts throughout the several views of the drawings.

Figure 2:
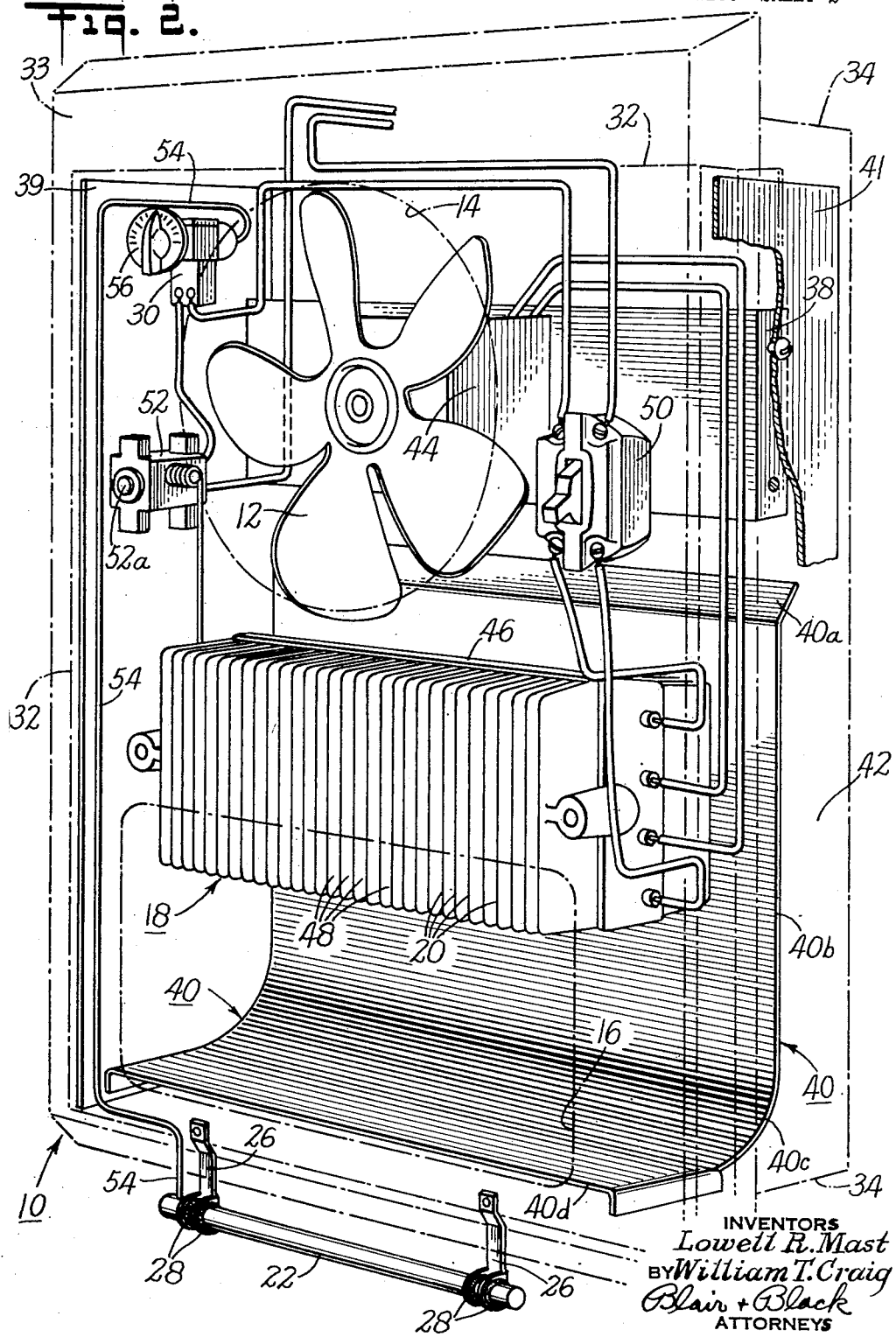
Figure 2 is an enlarged perspective view of the heater with its cover removed to show the parts of the heater in their assembled relationship and the position of the thermostat relative to these parts.

In the use of heaters where the temperature is automatically regulated, thermostats are generally provided to cut off the power to the heater when the room temperature rises above a predetermined value. In order to provide temperature regulation, the thermostat is conventionally located some distance from the heater, resulting in installation complications and unsatisfactory temperature regulations because of the location of the thermostat relative to the heater. It has been proposed to install the thermostat adjacent to or on the heater but such arrangements are usually inefficient because of the effect of radiant and/or conducted heat on the thermostat. In other words, the thermostat controls only the temperature in the immediate vicinity of the heater, leaving the room temperature at undesirable levels.

In accordance with one form of my invention a heating element is mounted within a casing having upper and lower openings. A fan in the casing sucks air through the upper or inlet opening and forces it downwardly through the casing past the heating element and out through the lower outlet opening, a baffle being so mounted in the casing relative to the lower opening that the warm air flows out in a horizontal stream. A thermostatic bulb depends from the bottom of the casing below the warm air stream and is heat insulated from the casing. Thus the thermostat is insensitive to both radiant and conducted heat from the heater.

Thus cool air is drawn into the heater, generally indicated at 10 (Figure 1), through an intake opening 14 by a fan 12 (Figure 2) and is discharged after being heated, through an outlet opening 16 at the bottom thereof. A heating grid, generally indicated at 18 (Figure 2) is positioned between openings 14 and 16 and includes a plurality of uniformly spaced heating fins 20, which heat the cool air passing through the spaces therebetween. A thermostatic bulb 22 is connected to the bottom of heater 10 below outlet opening 16 and responds to changes in room temperature to control the heater.

More particularly, the heating apparatus is enclosed in a casing comprising a wall box 34 (Figure 2), a front plate 32 in which the openings 14 and 16 are formed, and a cover plate 33 (Figure 1) having openings 15 and 17 which register with openings 14 and 16 when the casing is assembled. A pair of side plates 39 and 41 are attached to the front plate 32 and have mounted thereon a back plate 38 (Figure 2) and a baffle generally indicated at 40. Back plate 38 supports a motor 44 which drives fan 12, the fan being juxtaposed to inlet opening 14. Plate 38 and baffle 40 are preferably separated from each other and from the rear side of wall box 34 to form therewith a passageway 42 through which some of the cool air drawn into the heater flows to keep the rear side of the wall box cool.

The upper end 40a of baffle 40 is flanged rearwardly to guide the main air stream impinging from plate 38 downwardly and through the fins of heating grid 18. The baffle also includes a vertical portion 40b integral with the flange portion 40a and forming a guideway past the rear of grid 18, a radially curved portion 40c and a horizontal portion 40d adjacent the bottom of opening 16. Portion 40c is radially curved to change the flow of air from a vertical to a horizontal direction with minimum turbulence, and horizontal portion 40d is preferably slightly separated from opening 16 to form an outlet for the air flowing through passageway 42. Thus air drawn into the heater by fan 12 is forced past grid 18 and discharged through opening 16.

Heating grid 18 is positioned between the baffle 40 and front plate 32. The grid has a plurality of uniformly spaced fins 20 (Figure 2) extending perpendicularly from a backbone portion 46, which encloses a tubular electrical heating member (not shown). The spaces 48 between the fins 20 permit the cool air to be heated while passing downwardly through the heater.

The thermostatic control includes a conventional electrical contact assembly 30 and thermostatic bulb 22. Bulb 22 is made from a metal having good heat-conducting properties and is a relatively long and thin cylinder closed at both ends and filled with fluid. Such a bulb construction provides a maximum surface area in comparison with the amount of metal used and the amount of fluid in the bulb, thereby permitting the fluid pressure to vary instantaneously in response to changes in room temperature. Each end of bulb 22 depends by a bracket 26 (Figures 2 and 3) from the bottom of the front plate 32 but is heat insulated from the bracket by rubber grommets 28 in which the bulb rests. A capillary tube 54 interconnects bulb 22 and electrical contact assembly 30 and thus constitutes a conduit for fluid flow in either direction as the bulb responds to temperature variations. The temperature value to which the electrical contact assembly 30 responds may be set as desired by a rotatable knob 56 (Figure 2) connected to the contact assembly.

A conventional master switch 50 and a safety switch 52 are mounted on the front plate 32. The safety switch 52 serves as a control to prevent the heating grid 18 from operating above a predetermined temperature in case the fan motor 44 should fail or the air flow through the heater should be stopped from any cause. When the safety switch opens, the heater remains inoperative until the trouble is corrected and switch button 52a is pressed.

With safety switch 52, electrical contact assembly 30 and master switch 50 closed, electrical energy is supplied to heat the grid 18 and energize motor 44 to rotate fan 12. The fan circulates air through heater 10. This air is heated as it travels downwardly through the spaces 48 between adjacent fins 20 and is thereafter directed at considerable velocity by baffle 40 through bottom opening 16 (Figures 2 and 4) into the room to be heated.

As shown in Figure 4 heater 10 is preferably installed in the lower portion of the wall 60 of the room with thermostat bulb 22 located a few inches above the usual baseboard 62. With the heater so positioned the high velocity heated air enters the lower region 64 of the room in an initial substantially horizontal trajectory thus creating a relatively high-pressure condition in region 64, a relatively low-pressure condition in region 66, i. e. along the room floor and another relatively low-pressure condition in region 68 (see Figure 5) adjacent the upper portion of heater 10 where its inlet opening is located. Under these conditions, the heated air flows outwardly into the room and because of its high pressure expands and circulates in all directions, i. e. upwardly, downwardly and sidewise thus effectively heating the atmosphere in the "living area" of the room.

As the air circulates it tends to flow toward the low-pressure regions 66 and 68. Bulb 22 being located in region 66 is accordingly positioned to sense quickly any change in room temperature from that which it is desired to maintain. Thus cold floor drafts are effectively obviated. The air circulating into low-pressure region 68 is, of course, subject to the suction of fan 12 (Figure 2) and is accordingly drawn into the heater through its upper or inlet opening. As a result the circulation conforms generally to the paths indicated by the arrows in Figures 4 and 5. In other words, the heater operates on what might be termed the down-flow principle thus providing maximum heat distribution with no cold drafts along the floor or drastic differences in temperature at various room levels.

As previously stated, the thermostatic bulb 22 is made from a metal having good heat-conducting properties and has a large surface area in comparison to the amount of metal used. Therefore, any temperature changes in the region 66 are quickly transmitted through the metal to the fluid held within the bulb so as to effectuate a corresponding change in the fluid pressure. This change in fluid pressure is in turn transmitted quickly and efficiently through the capillary tube 54, thereby varying the pressure exerted against the electrical contact assembly 30. When the temperature in region 66 reaches a value corresponding to the setting of knob 56, the fluid opens the electrical contact assembly and breaks the heater circuit. The thermostat operates without the movement of any parts other than the contact assembly itself, and so requires no servicing or recalibrating when once put into operation.

As there are no exposed hot electrical wires in grid 20 which might ignite scraps of paper or other inflammable material drawn into the heater there can be no factor of danger from this cause. Furthermore, because the heater operates on the forced-draft, down-flow principle, dirt or soot particles entering the heater pass through the heater and drop to the floor as they are emitted from the opening 16. As a result, the walls above the heater show no smudge, soot or scorch marks.

There is thus provided a heater having a thermostat connected directly thereto, which responds reliably and accurately to room temperatures. Thus the objects of attaining a reliable temperature response with a thermostat located adjacent the heater are attained in a simple and efficient manner.

Since many embodiments may be made of the present invention and since many changes may be made in the embodiment disclosed herein, all without departing from the scope of the appended claims, it is to be understood that the foregoing description is to be interpreted as illustrative only and not in a limiting sense.

What is claimed is:

1. In heating apparatus for maintaining an enclosure at a predetermined temperature, a casing having a top air inlet and a bottom air outlet, means adjacent said air inlet for drawing air into said apparatus, means intermediate said air inlet and outlet for heating said air, and thermostatic means connected to control said heating means including a temperature sensitive member secured to the bottom of said casing below said air outlet.

2. In heating apparatus for maintaining an enclosure at a predetermined temperature, a casing having a top air inlet opening and a bottom air outlet opening, a fan in said casing in juxtaposition to said top opening for drawing cool air into said apparatus, heating means in said casing between said top and bottom openings, thermostatic means connected to control said heating means including a temperature sensitive member, and means for securing said member to said casing below said outlet opening in heat insulated relation to said casing.

3. In heating apparatus for maintaining an enclosure at a desired temperature, a casing having a top air inlet and a bottom air outlet, a fan adjacent said air inlet for drawing air into said casing, a heating member between said air inlet and outlet, a thermostatic member connected to control said heating member, heat-insulated brackets for securing said member to said casing below said bottom outlet, and a baffle channelizing the passage of air past said heating member and horizontally from said outlet above said heat-responsive member.

4. In heating apparatus for maintaining an enclosure at a predetermined temperature, intake means for drawing air into said apparatus, means for directing said air flow downwardly through said apparatus, a heating member located in the path of said air flow, thermostatic means connected to the bottom of said apparatus and exteriorly thereof and containing a fluid whose pressure varies with changes in temperature of said enclosure, and switching means in said apparatus connected to said thermostatic means and actuated by a change in pressure of said fluid to cut off the energy supply to said heating member.

5. In heating apparatus for maintaining an enclosure at a predetermined temperature, a casing, means for drawing air into said apparatus, a baffle, a heating grid snugly positioned between said casing and said baffle and having a plurality of spaced fins adapted to permit the passage of air past said grid, said baffle having a substantially vertical portion for directing the air downwardly past said heater and a substantially horizontal portion joined to said vertical portion by an arcuate portion so as to direct the heated air horizontally from said apparatus with minimum turbulence, and thermostatic means secured to said casing construction below said outward air stream and connected to control the operation of said heating grid.

6. In heating apparatus for maintaining an enclosure at a predetermined temperature, a casing having a top air inlet and a bottom air outlet, heating means for said enclosure including a fan adjacent said inlet for drawing air into said apparatus and a heater intermediate said inlet and outlet for heating said air drawn in by said fan, and thermostatic means disposed below said air outlet adjacent said casing and connected to control said heating means.

7. In heating apparatus for maintaining an enclosure at a predetermined temperature, heating means for said enclosure including a heater, a casing surrounding said heating means and having a top cool air inlet and a bottom warm air outlet below said heater, said heating means including a fan in juxtaposition to said top opening and above said heater for directing cool air over said heater and through said bottom outlet, and thermostatic means connected to control said heating means, and means for insulating said thermostatic means from the radiant and conducted heat of said heating means, said thermostatic means being disposed below said bottom outlet so as to be exposed to the relatively cool air circulating along the floor of said enclosure.

LOWELL R. MAST.
WILLIAM T. CRAIG.

REFERENCES CITED

The following references are of record in the file of this patent:

UNITED STATES PATENTS

| Number | Name | Date |
| --- | --- | --- |
| 1,788,515 | Gannon | Jan. 13, 1931 |
| 2,471,784 | Seifner et al. | May 31, 1949 |